United States Patent [19]
Fischel et al.

[11] Patent Number: 5,909,806
[45] Date of Patent: Jun. 8, 1999

[54] LAPTOP CARRYING CASE

[76] Inventors: Harold Fischel, 7 Soundview Dr.; Anthony H. Handal, 3 Blue Chip Ln., both of Westport, Conn. 06880

[21] Appl. No.: 08/731,190

[22] Filed: Oct. 7, 1996

Related U.S. Application Data

[63] Continuation-in-part of application No. 08/556,720, Nov. 13, 1995, abandoned.

[51] Int. Cl.⁶ .............................. B65D 85/30; A45C 3/02
[52] U.S. Cl. ........................ 206/320; 206/522; 206/591; 190/115
[58] Field of Search .................................. 206/521, 522, 206/523, 576, 320, 591, 594; 190/100, 109, 115, 124; 383/3

[56] References Cited

U.S. PATENT DOCUMENTS

| | | | |
|---|---|---|---|
| 848,889 | 4/1907 | Fitzgerald. | |
| 1,601,547 | 9/1926 | Wofford. | |
| 1,792,627 | 2/1931 | Bowersock. | |
| 2,979,246 | 4/1961 | Liebeskind. | |
| 3,477,553 | 11/1969 | Kish, Jr. | 190/124 |
| 3,730,308 | 5/1973 | Pelavin | 190/124 |
| 4,339,039 | 7/1982 | Mykleby. | |
| 4,573,202 | 2/1986 | Lee | 206/522 |
| 4,762,231 | 8/1988 | Kiselewski | 206/522 |
| 4,801,213 | 1/1989 | Frey et al. | 206/522 |
| 4,874,093 | 10/1989 | Pharo | 206/522 |
| 5,002,184 | 3/1991 | Lloyd | 206/523 |
| 5,010,988 | 4/1991 | Brown | 206/521 |
| 5,494,157 | 2/1996 | Golenz et al. | 206/521 |
| 5,624,035 | 4/1997 | Kim | 206/522 |

*Primary Examiner*—Paul T. Sewell
*Assistant Examiner*—Luan K. Bui
*Attorney, Agent, or Firm*—Handal & Morofsky

[57] ABSTRACT

A shock absorbing structure comprising a bladder having an undeformed shape and being constructed of a substantially gas impervious material. The bladders are filled with a resiliently deforming material, said material deforming in response to an application of force upon said bladder and returning to its undeformed shape upon removal of such applied force. The bladder being in communication with an air release member, to allow for discharge of air when said force is applied upon the bladder.

14 Claims, 21 Drawing Sheets

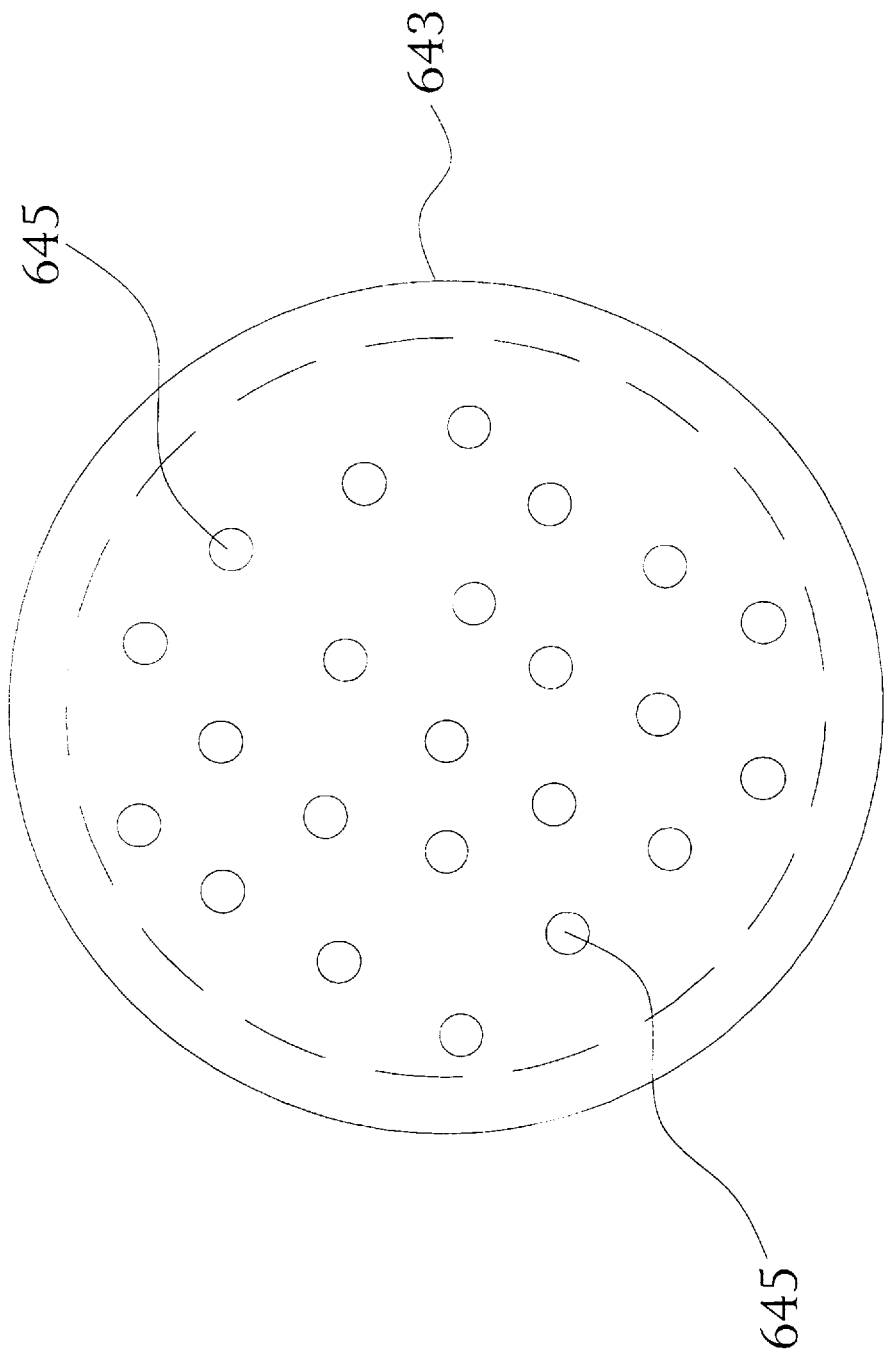

phpLAPTOP CARRYING CASE

TECHNICAL FIELD

This is a continuation-in-part of application Ser. No. 08/556,720, filed on Nov. 13, 1995, abandoned. The present invention relates to the field of carrying cases for laptop computers of the type which include structures to absorb impacts due to dropping of the case, jostling or other causes.

BACKGROUND

Over the years there has been extensive development of the technology for moving such small items as books, equipment, and the like. Bags and brief cases come in a wide variety of forms and are adapted for a wide range of purposes. For example, they can be in the form of simple brief cases which can range from soft leather or imitation leather in a rectangular configuration, through to rigid carrying cases made of rigid plastic or leather incorporating rigid elements. Likewise, brief cases made of non-rigid materials are often made rigid with metal strips, metal perimeterial bands which give the brief case a hard edge and soft sides, and the like.

The transport and movement of delicate equipment, such as cameras and the like, present special problems. One classic solution to this problem is the hard plastic case containing a foam plastic shock protector which has a plurality of compartments sculpted into it. The various items to be protected, such as the camera, lens, and the like, are put into compartments which substantially match their shape and size.

In recent years one of the more typical applications for advanced luggage technology has been in connection with the movement of portable computers, such as laptop computers. In this regard a great number of applications have arisen involving structures which provide for the portability of laptop computers.

The earliest structures for containing laptop computers consisted of conventional bags which were simply proportioned and scaled to the job of carrying a laptop computed.

Recognizing the delicate nature of laptop computers, and the liquid crystal screens which they employ, which are perhaps the most delicate and likely to damage part of the computer, bag manufacturers quickly came to realize the special problems involved and began to work on the problem of providing for the safe transport of laptop computers. The first steps to be taken involved the use of shock absorbing materials in the bags.

The materials which they used, which remain in use today, principally comprise foam plastic materials with a wide range of characteristics. Such materials are also used in a wide range of thicknesses, dependent upon the position of the particular shock absorbing member, its characteristics, and other structural features. The problem with such systems is that they will only work for a range of laptop computer sizes which is relatively limited.

More advanced systems have involved the use of shock absorbing pads which are contained within fabric housings. These fabric housings are secured to the inside of the bag by a hook and eye. fabric adhesion system, such as that manufactured by the Velcro Corporation and sold under the trademark Velcro. As may be apparent, the use of Velcro fasteners allows the housings containing the shock absorbers to be moved tube a variety of positions, thus enabling them to accommodate a wide range of sizes of laptop computers with a snug fit, presumably insuring better absorption of shocks due to various types of impact, such as falling, bumping during transport and impacts due to placement on a hard surface such as a table.

In one bag of this type, the sides of the bag are provided with a thin layer of foam material having a thickness on the order of 1 cm. The shock absorber pads are about one inch thick or about 2.5 centimeters in thickness and may be moved to a variety of positions.

In an attempt to address the problem of providing for the transport of laptop computers of different size without the complication of movable shock absorbers, a new type of system has been introduced. In this bag, the four edges of the bag are reinforced with a rigid perimeterial band of rigid plastic or metal which forms a substantially closed loop of rectangular configuration. This closed loop has a thickness substantially equal to the thickness of the bag. The two sides of the bag are provided with a thin layer of foam plastic which serves as a shock absorbing material. The bag is provided with a carrying handle which is secured to one of the sides of the loop. On the opposite side of the loop, an array of rubber shock absorbing bag feet are positioned.

In this system shock absorption is provided by a stretchable or elastic fabric cradle which comprises a rectangular sheet of elastic fabric secured at one end to the rigid band. It is dimensioned to be disposed around the bottom edge of a laptop computer when that computer is being carried around in the bag.

The opposite edge of the rectangular fabric cradle is also secured to the top edge of the rigid band. However, instead of being permanently secured thereto at a fixed position, it is secured by a pair of adjustable straps. The straps are adjustable in their length, thus providing for the accommodation of a range of laptop computer sizes.

In accordance with this technology, if a laptop computer in a bag is dropped, the impact is first felt by the rigid perimeterial band. The impact is transmitted to the laptop computer through the elastic cradle. Because the cradle is elastic, the laptop computer will not be instantly stop, but, instead, will continue to move at substantially its free fall speed, but subject to gradual deceleration due to the force exerted by the elastic cradle as it is being stretched by the displacement of the laptop computer in the downward direction during impact absorption. The rest is that a shock which would normally be experienced by the laptop computer as an impulse, to use the parlance of stochastic linear system analysis, due to the experiencing of a step in the displacement function representing the position of the bag, is smoothed out into a more complex function related to the displacement of the laptop computer after impact and the spring constant for the elastic material of the cradle.

SUMMARY OF THE INVENTION

The invention, as claimed, is intended to provide a remedy. It solves the problem of how to provide for the absorption of impacts experienced by a laptop computer during a fall or other similar experience. The same is achieved by a structure which accommodates computers of various sizes and at the same time allows for a very advantageous absorption of the impact force over time. In the preferred embodiment, the result is uniform deceleration at a non damaging rate and performance superior to prior art systems.

BRIEF DESCRIPTION OF THE DRAWINGS

One way of carrying out the invention is described in detail below with reference to drawings which illustrate only one specific embodiment of the invention and in which:

FIG. 21 is a plan view of the air release button of FIG. 21.

DETAILED DESCRIPTION OF THE PREFERRED EMBODIMENTS

Figure 1:
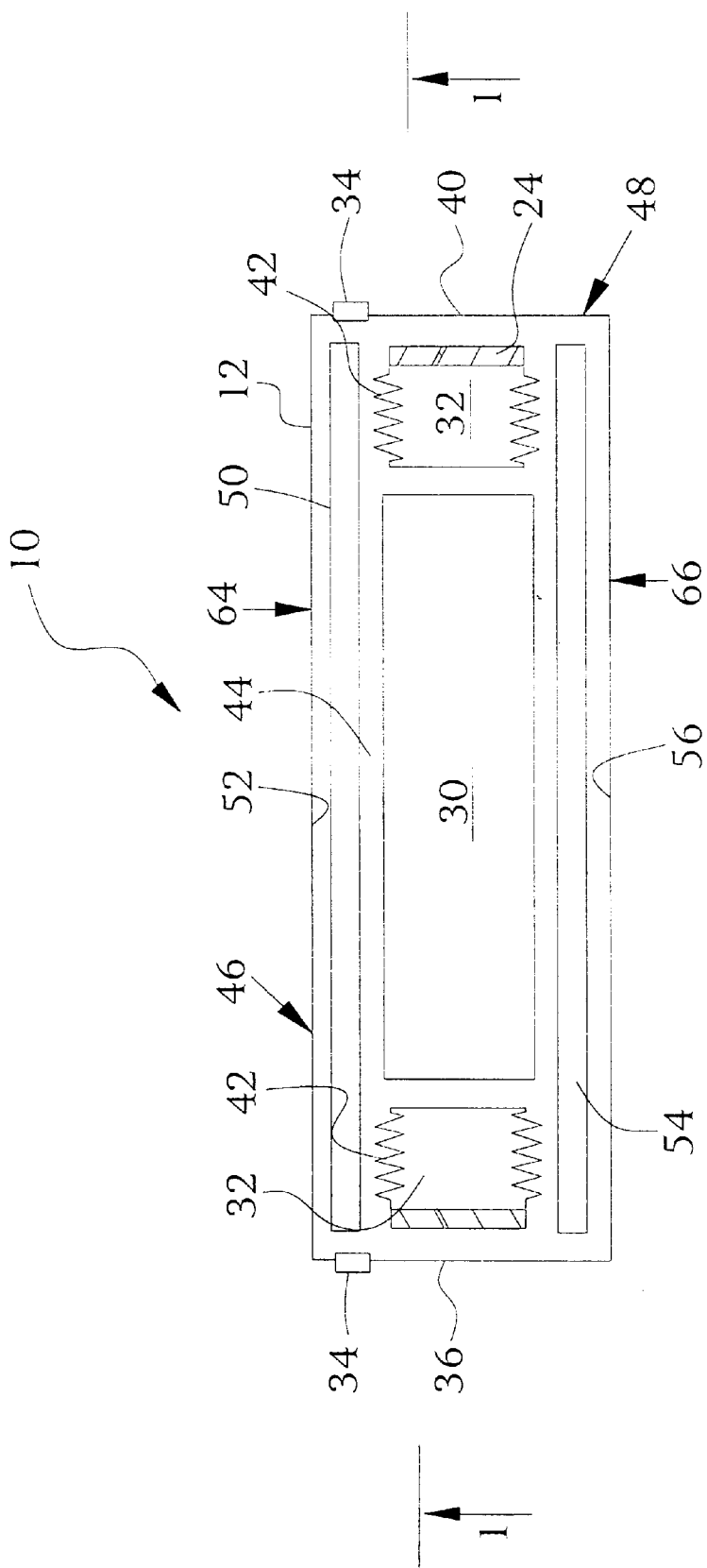
FIG. 1 is a schematic cross-sectional view of a computer case constructed in accordance with the present, invention.

Referring to FIG. 1, the structure of the preferred embodiment of a shock absorbing computer case 10 can be seen. Case 10 comprises an outer shell 12. Outer shell 12 is made of any suitable material, such as a high impact plastic. Alternatively, a semi-rigid material, such as reinforced leather may be used. Flexible material, such as canvas, will give the bag another look and relatively low cost, and may also be employed in fabrication.

Outer shell 12 of case 10 contains the various components of the shock absorbing system. This system comprises a set of compressible air bladders 14, 16, and 18. Rigid flat plates 20, 22, and 24 are secured to bladders 14, 16 and 18, respectively.

Rigid flat plates 20, 22 and 24 can be made of any substantially rigid material, such as metal or wood. In accordance with the preferred embodiment a high strength lightweight plastic is employed.

Air bladder 14 is secured to rigid flat plate 20 most preferably by an adhesive which is flexible after setting. Naturally, other means can be utilized to secure the plate to the bladder. In similar fashion, compressible air bladder 16 is mounted to rigid flat plate 22. Again, in similar fashion, compressible air bladder 18 is mounted to rigid flat plate 24. Each air bladder flat plate assembly is held in place in outer shell 12 with an adhesive which is flexible after setting. Naturally, other suitable means may be utilized to secure the air bladder flat plate assemblies to the outer shell 12.

A handle 26 provides for convenient carrying of the bag and is secured to the top of shell 12 and a rigid handle anchoring strip 28 of conventional design. Still referring to FIG. 1, handle 26 can be seen attached to the outside of case 10. In the preferred embodiment handle 26 is made of a rigid material, such as plastic, but a flexible handle such as canvas or cloth can be used. Preferably handle 26 is attached with rivets but other suitable means may be utilized. For example if a flexible handle, such as canvas, is utilized, then the handle can be stitched to the case.

Figure 2:
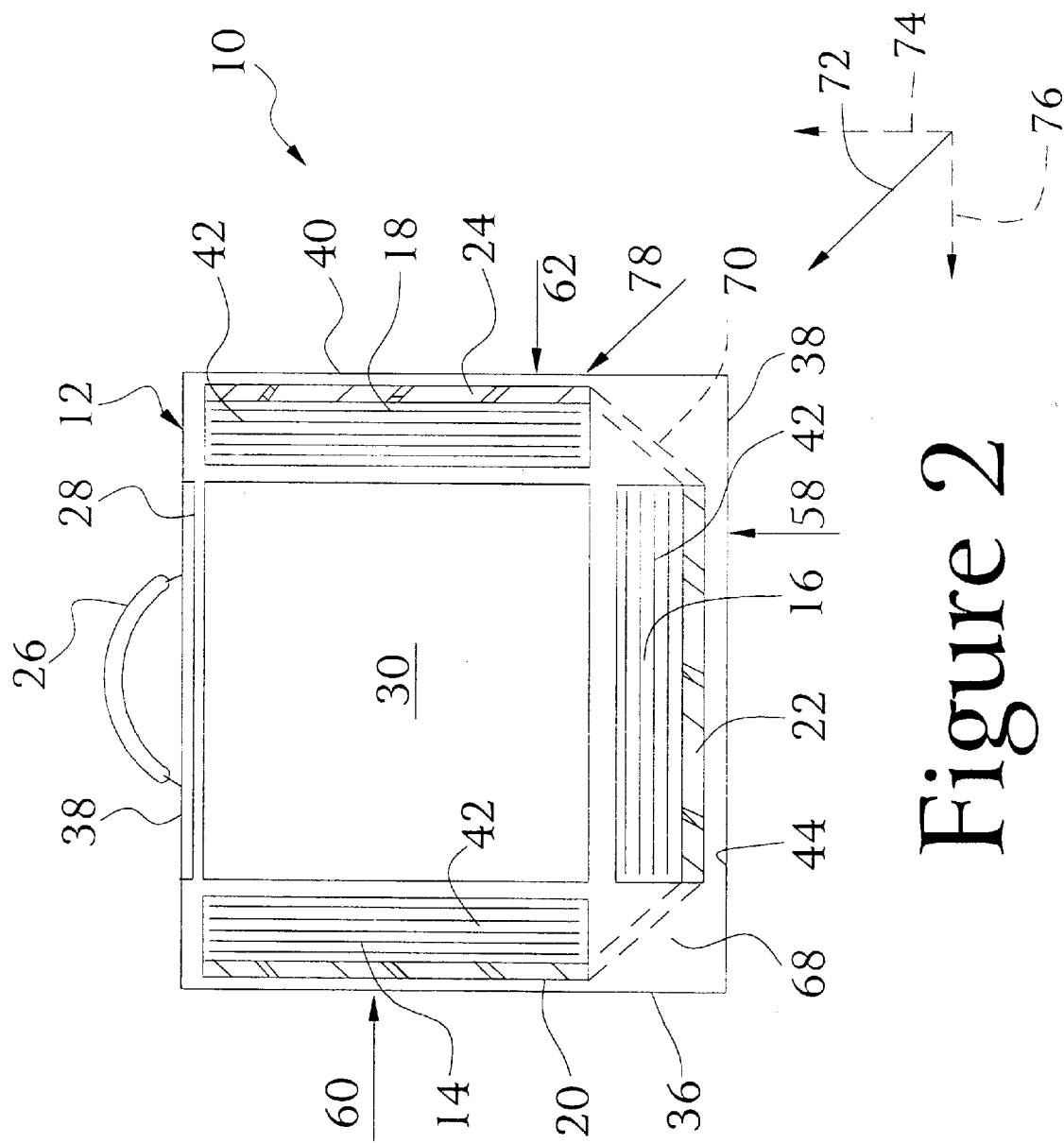
FIG. 2 is a cross-sectional view of the ease of FIG. 1 along lines 1—1 of FIG. 1.

As shown in FIG. 2, a laptop computer 30 can be seen as it is oriented in its preferred carrying position in case 10.

As can be seen with reference to FIG. 2, the air bladders are airtight containers which contain a quantity of air in the internal volume 32 which they define.

A zipper 34 runs along an edge 36 of outer shell 12, continues along edge 38 of outer shell 12, and again continues along a edge 40 of outer shell 12, where it meets at a hinge 44, defined by the fabric interface between the top portion or lid 46 of the case 10 and the main body 48 of case 10.

Again referring to FIG. 2, compressible air bladders 14, 16 and 18 are made of a flexible material, most preferably a plastic which imitates the properties of rubber but which can be relatively unstretchable. In accordance with the preferred embodiment, pleats 42 are provided in an accordion-like fashion, thereby making the stretchability of the of the material less critical. If pleats are not utilized the material used to make the air bladders can be more stretchable.

However, in principle, no strechability is required, as the air bladder can rely strictly on the compressibility of the air contained within it to achieve the spring effect required for shock absorption. In the event that a stretchable material is used, or in the similar case where deformable accordion-like pleats are used, the spring constant of the system will be a complex resultant of the compressibility of air and the characteristics of deformability or stretchability of the bladders.

A cross section of the preferred embodiment of the inventive device can be seen in accordance with FIG. 2. In particular, a layer of compressible foam 50 is mounted to an inside surface 52 of outer shell 12. Foam layer 50 is mounted, most preferably, by an adhesive which remains flexible after setting. Once again other suitable means may be utilized to secure foam layer 50 to surface 52. In similar fashion, a layer of compressible foam 54 is mounted to a surface 56 of outer shell 12.

In the preferred embodiment, shown in FIG. 2, when a force is applied, as shown by an arrow 58, to outer shell 12, rigid flat plate 22 serves to spread the force over the area of air bladder 16 thereby reducing the per area unit force experienced by computer 30. This reduction in per area unit force translates into lower incidence of damage to computer 30.

This is the case because all of the energy involved in the reduction of the velocity of the computer during an impact is not concentrated in one spot, but is spread out, resulting in relatively small amounts of energy being absorbed by different parts of the computer.

In similar manner, a force, as shown by an arrow 60, is spread across bladder 14 by plate 20 again reducing the per area unit force experienced by computer 30. In similar manner still, a force, as shown by an arrow 62, is spread across bladder 18 by plate 24, once again reducing per area unit force experienced by computer 30.

Referring, still, to the preferred embodiment shown in FIG. 2, foam layer 50, by compressing, acts to absorb a force as shown by an arrow 64 thereby reducing the impact to computer 30. In like fashion foam layer 54 acts to absorb forces as shown by a arrow 66 again reducing the impact to computer 30.

As compared to conventional foam padding, air bladders offer the advantage of relatively quick recovery, something particularly valuable in the case of multiple impacts.

In accordance with a particularly preferred embodiment of the invention, a pair of corners 68 and 70 are provided. Corners 68 and 70 are made of a rigid material, preferably the same material as rigid flat plates 20, 22, and 24. Moreover, in accordance with the preferred embodiment, all of the rigid flat plates and the corners are made of a single member such as steel, cast plastic, or an extruded heat-formed plastic perimeterial member.

Corners 68 and 70 result in giving the bag a rigid perimeterial edge. From a functional standpoint, they also function to resolve impacts in directions other than the directions indicated by arrows 58, 60 and 62 into components in the directions indicated in accordance with conventional vector analysis theory.

More particularly, if, for example, we consider a force which impacts the bag in the direction indicated by arrow 72, this force can be resolved into two vector components represented by arrows 74 and 76. The force represented by arrow 74 would be transmitted to plate 22 which in turn would cause it to be applied to the computer 30 through bladder 16. Similarly, the force represented by arrow 76 would be applied to plate 24 which would transmit the force, over time, through bladder 18 to the laptop computer 30.

Without the use of such corners, the tendency of a force hitting the computer in the case in the direction and at the position indicated by an arrow 78, for example, would be to compress one side of the bladder 18, thus using only a portion of the volume of that bladder, as opposed to using all of the volume of the bladder and the volume of bladder 16, in addition. In similar fashion, a force striking the case at the position and at the angle indicated by arrow 62 would, through the use of corner 70, be absorbed using substantially all the volume of bladder 18.

An alternate embodiment of the inventive device can be seen in FIGS. 3 through 11. Generally, similar parts or parts performing analogous, corresponding or identical functions to those of the FIGS. 1 and 2 embodiment are numbered herein with numbers which differ from those of the earlier described embodiment or embodiments by multiples of one hundred.

Figure 3:
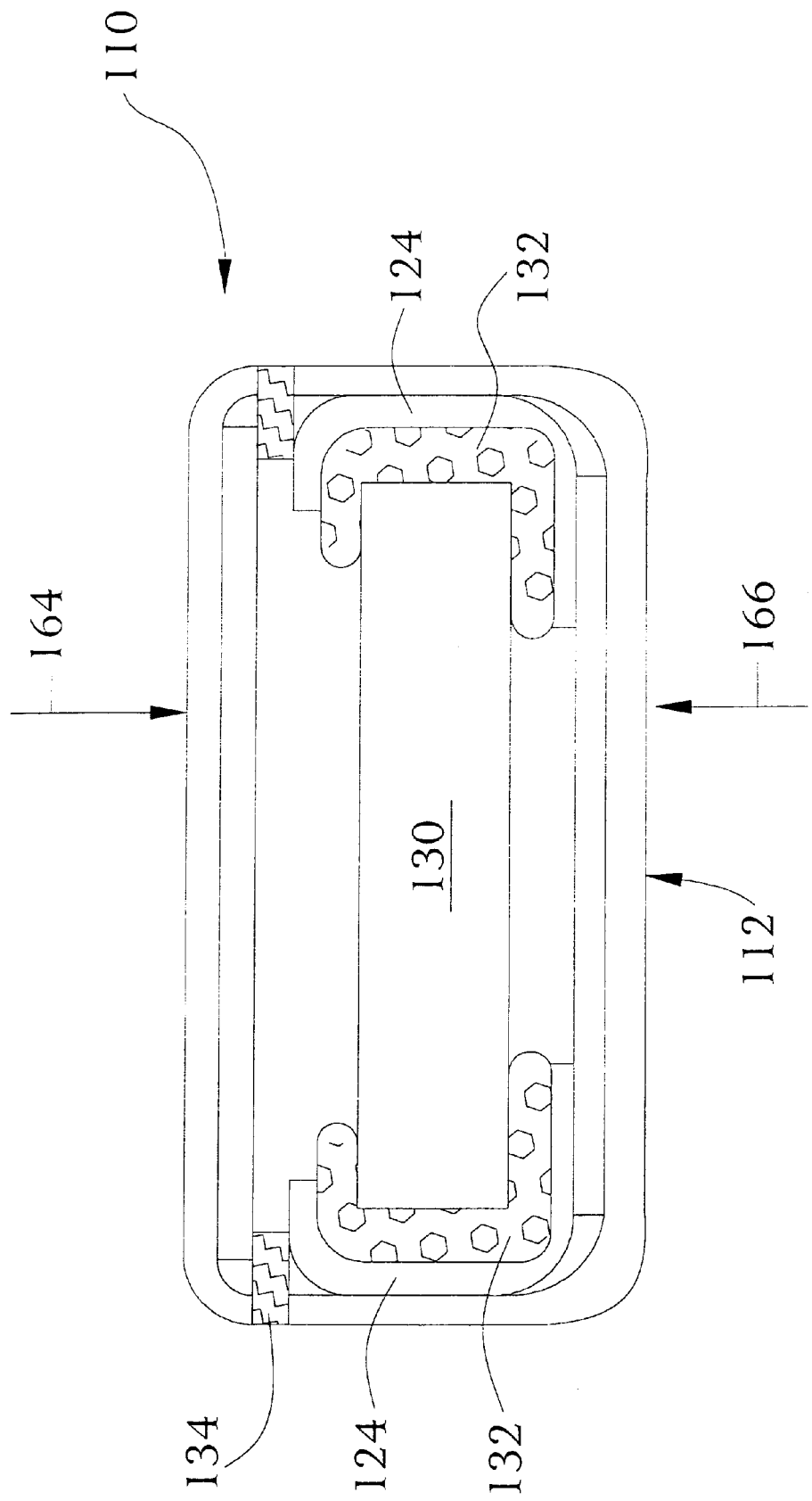
FIG. 3 is a cross-sectional view of a computer case constructed in, accordance with an alternative embodiment of the invention.
Figure 4:
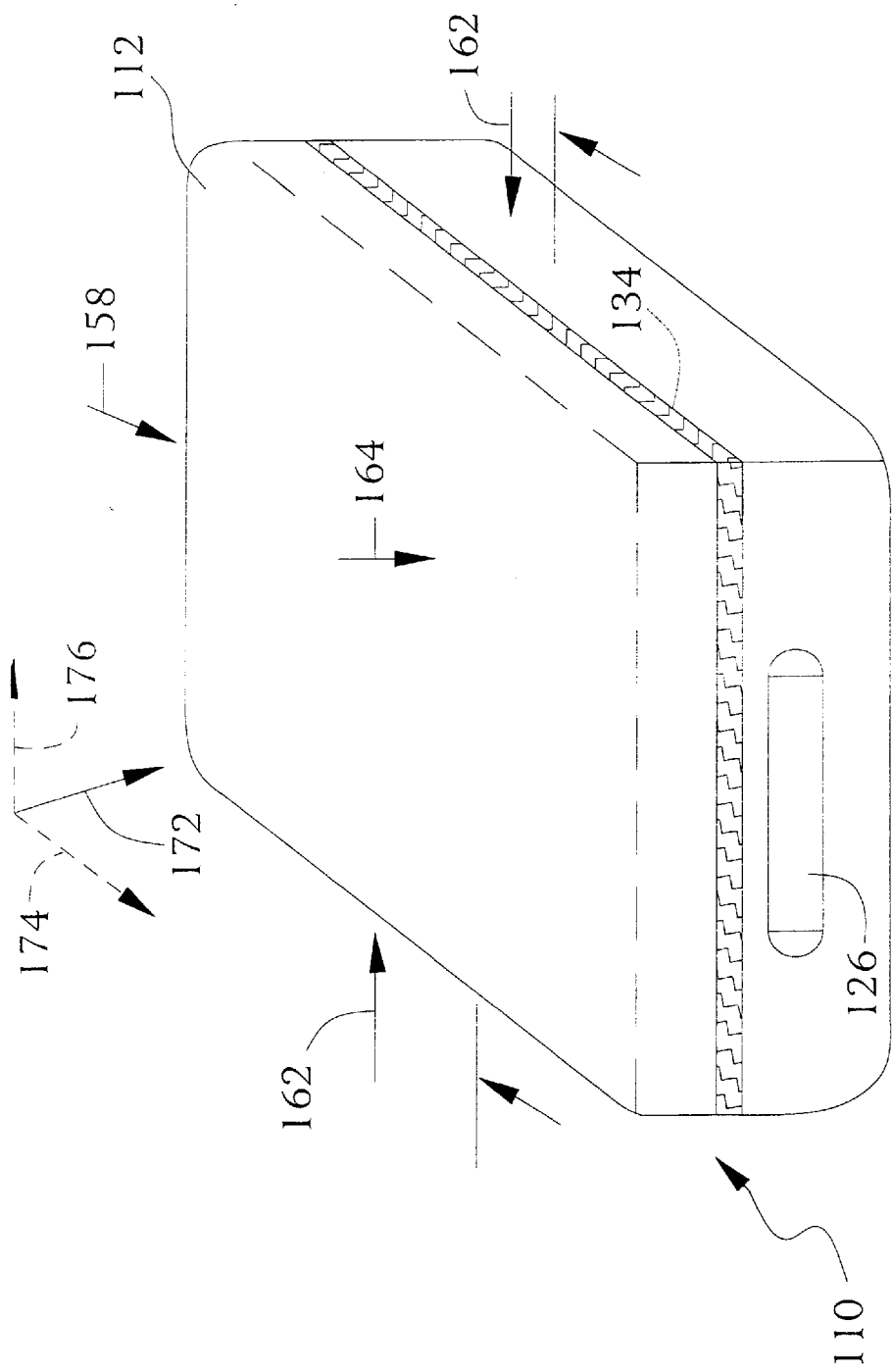
FIG. 4 is a perspective view of the case of FIG. 3.

Referring to FIG. 3, the structure of an alternative preferred embodiment of a shock absorbing computer case 110 can be seen. Case 110 comprises an outer shell 112 which is illustrated in FIG. 4.

Outer shell 112 is made of any suitable material, such as a high impact plastic. Alternatively, a semi-rigid material, such as reinforced leather may be used. Flexible material, such as canvas, will give the bag another look and relatively low cost, and may also be employed in fabrication.

Figure 5:
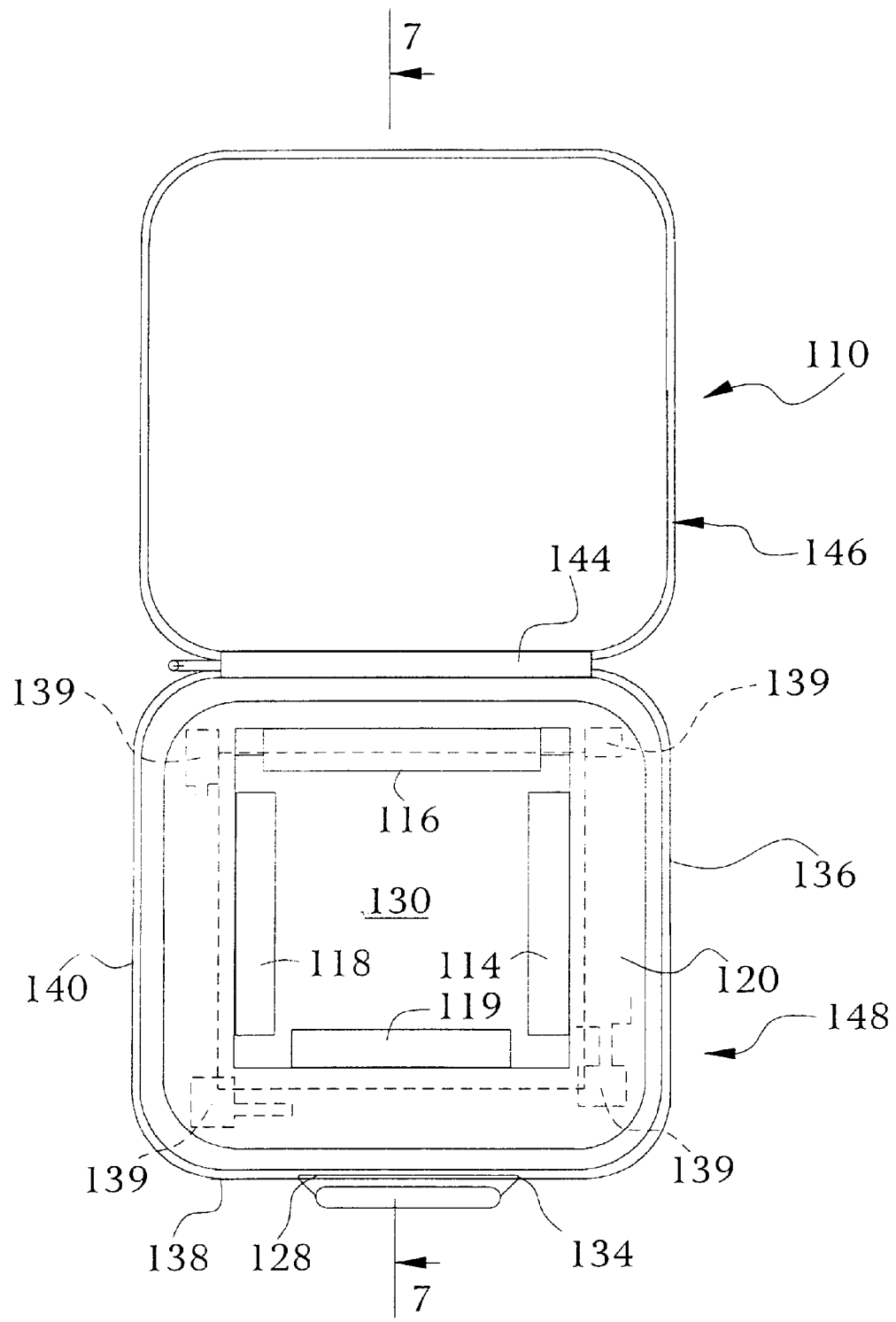
FIG. 5 is a plan view of the case of FIG. 3 with the top open to reveal principal components of the inventive case.

Case 110 contains the various components of the shock absorbing system. This system comprises a set of compressible air bladders 114, 116, 118 and 119, as is illustrated in FIG. 5.

Figure 6:
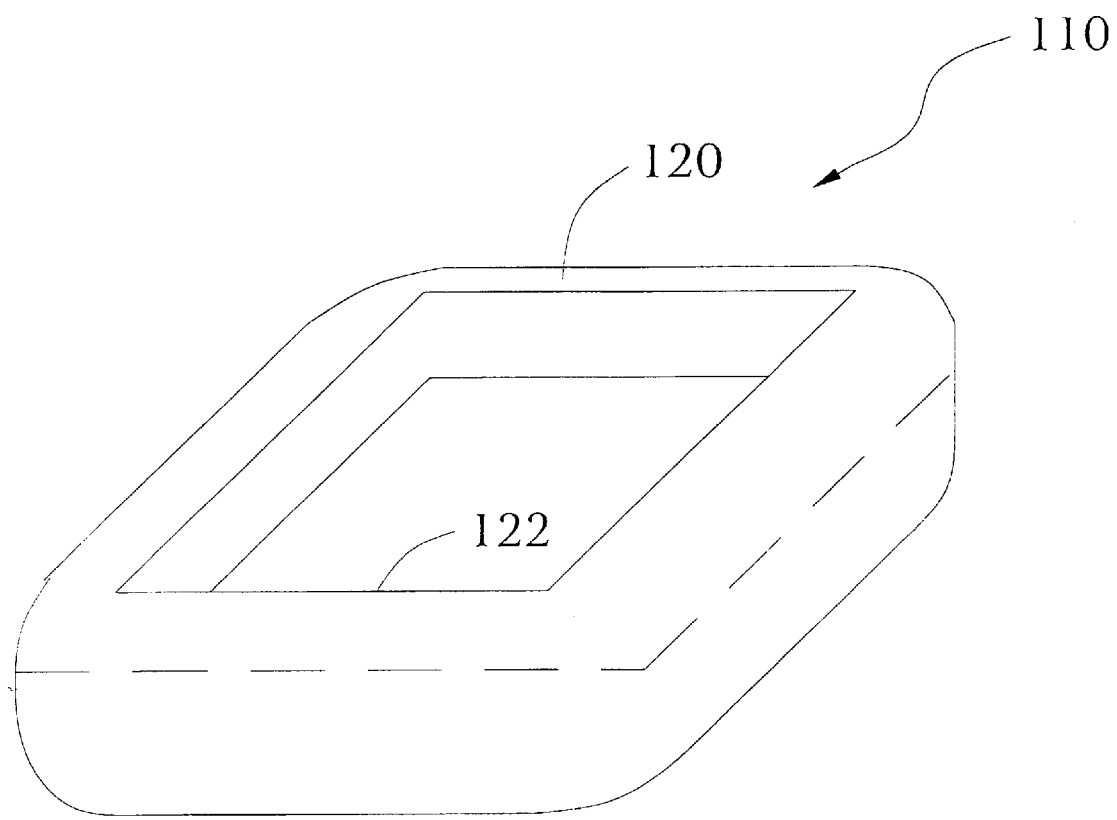
FIG. 6 is a perspective view of the rigid protective member of the embodiment of the inventive case of FIG. 3.

Bladders 114, 116 and 118 and 119 have a generally U-shaped cross section and are secured within a rigid plastic rectangular protective member 120. Member 120, as is illustrated in FIG. 6, defines a rectangular opening 122 and is configured with wraparound sides 124, as is most clearly illustrated in FIG. 3. Sides 124 serve the function of providing protection from shocks having components perpendicular to the planes which they define.

A handle 126 provides for convenient carrying of the bag and is secured to the top of the shell and a rigid handle anchoring strip 128 of conventional design.

Air bladder 114 is secured to rigid protective member 120 most preferably by an adhesive which is flexible after setting. Naturally, other means can be utilized to secure the member to the bladder. In similar fashion, compressible air bladder 116 is mounted to rigid member 120. Again, in similar fashion, compressible air bladders 118 and 119 are mounted to rigid member 120. Each air bladder member assembly is held in place in outer shell 112 with an adhesive which is flexible after setting. Naturally, other suitable means may be utilized to secure the air bladder member assemblies to the outer shell 112.

A handle 126 provides for convenient carrying of the bag and is secured to the top of shell 112 and a rigid handle anchoring strip 128 of conventional design. Still referring to FIG. 4, handle 126 can be seen attached to the outside of case 110. In the preferred embodiment handle 126 is made of a rigid material, such as plastic, but a flexible handle such as canvas or cloth can be used. Preferably handle 126 is attached with rivets but other suitable means may be utilized. For example if a flexible handle, such as canvas, is utilized, then the handle can be stitched to the case.

As shown in FIG. 5, a laptop computer 130 can be seen as it is oriented in its preferred carrying position in case 110.

Figure 7:
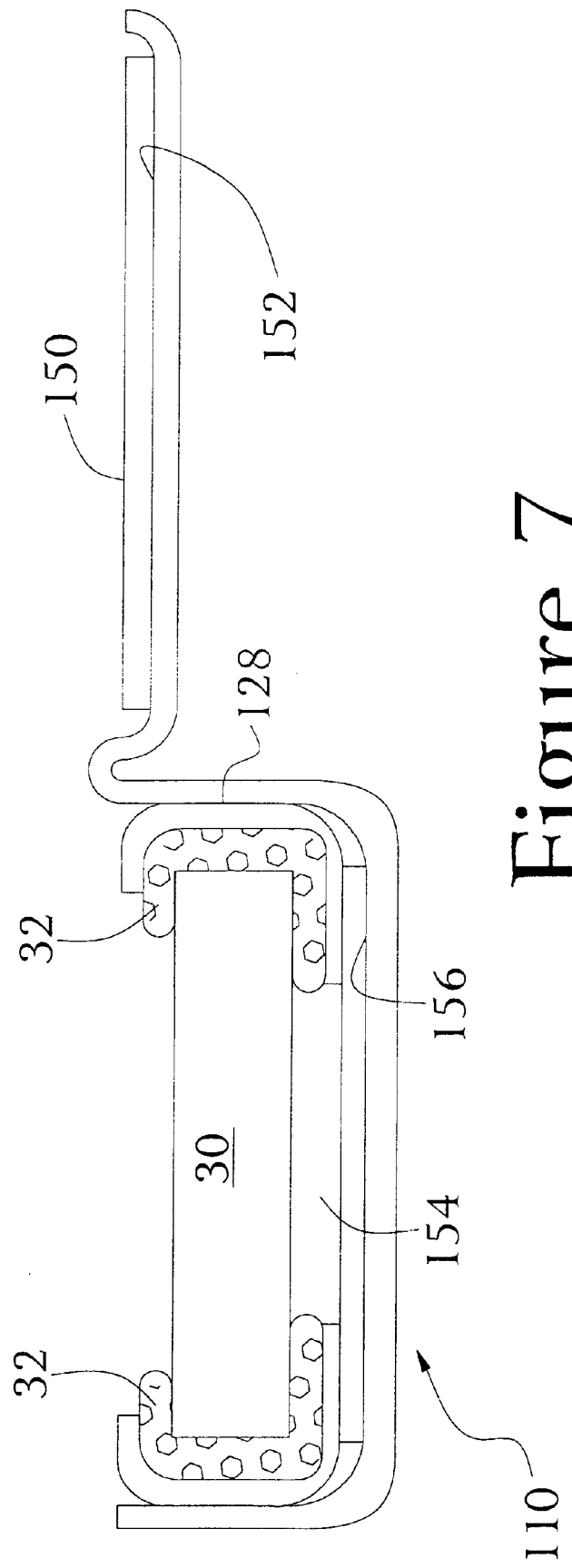
FIG. 7 is a cross-sectional view along lines 7—7 of FIG. 5.
Figure 8:
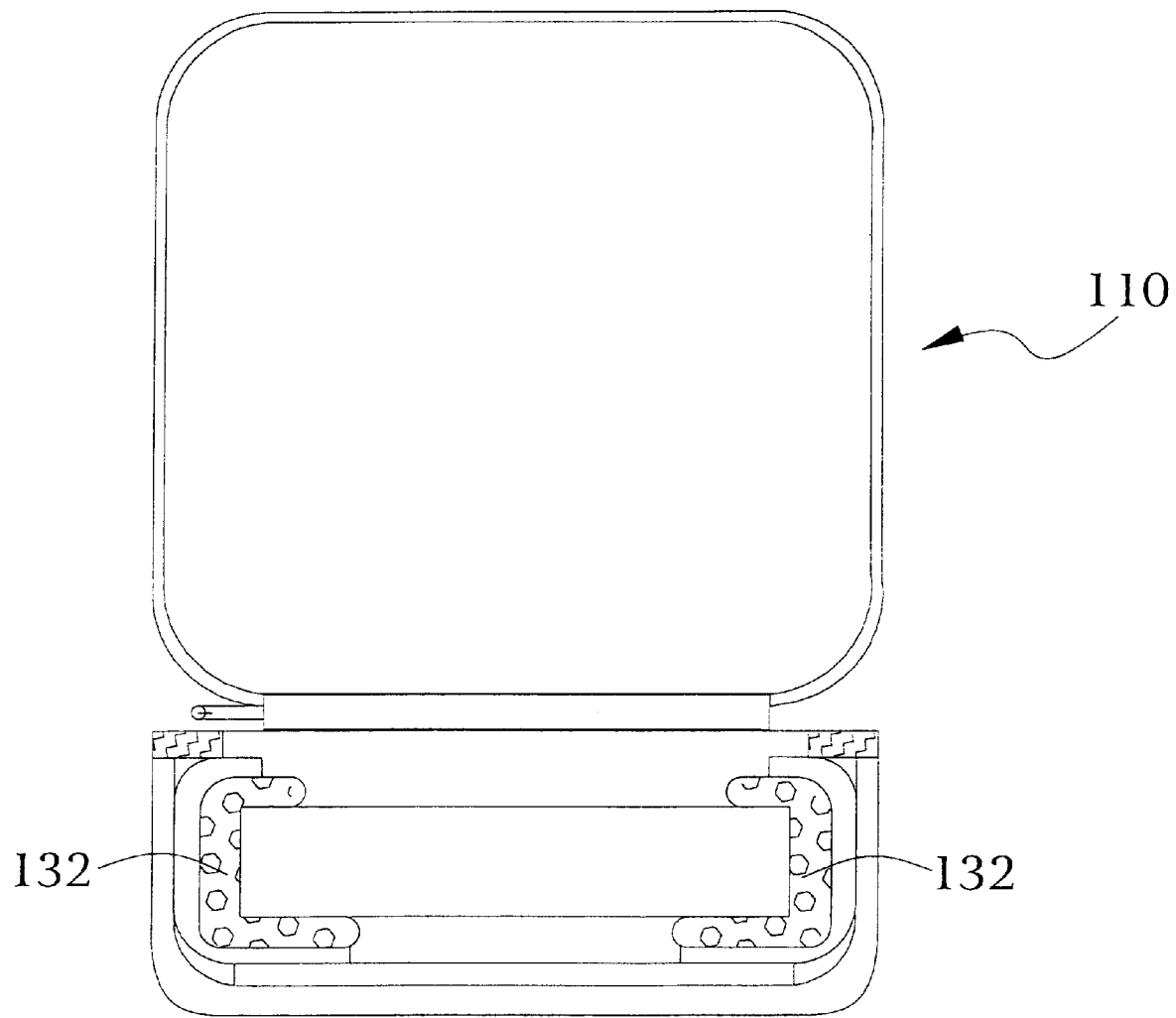
FIG. 8 is a side view of the case of FIG. 3, partially in cross-section.

As can be seen with reference to FIG. 7, the air bladders are airtight containers which contain a quantity of air and have an internal volume filled with a springy material 132 which incorporates mostly air spaces.

In accordance with the preferred embodiment, material 132 is springy polyester fiber of the type which is used to stuff pillows, and for similar purposes. Alternatively, one may use a foam plastic material similar to that used in sponges and in pillow stuffing.

In accordance with the preferred embodiment, each of the air bladders 114, 116, 118, and 119 are pneumatically coupled to air release boxes 139, as can be seen in FIG. 5.

Figure 9:
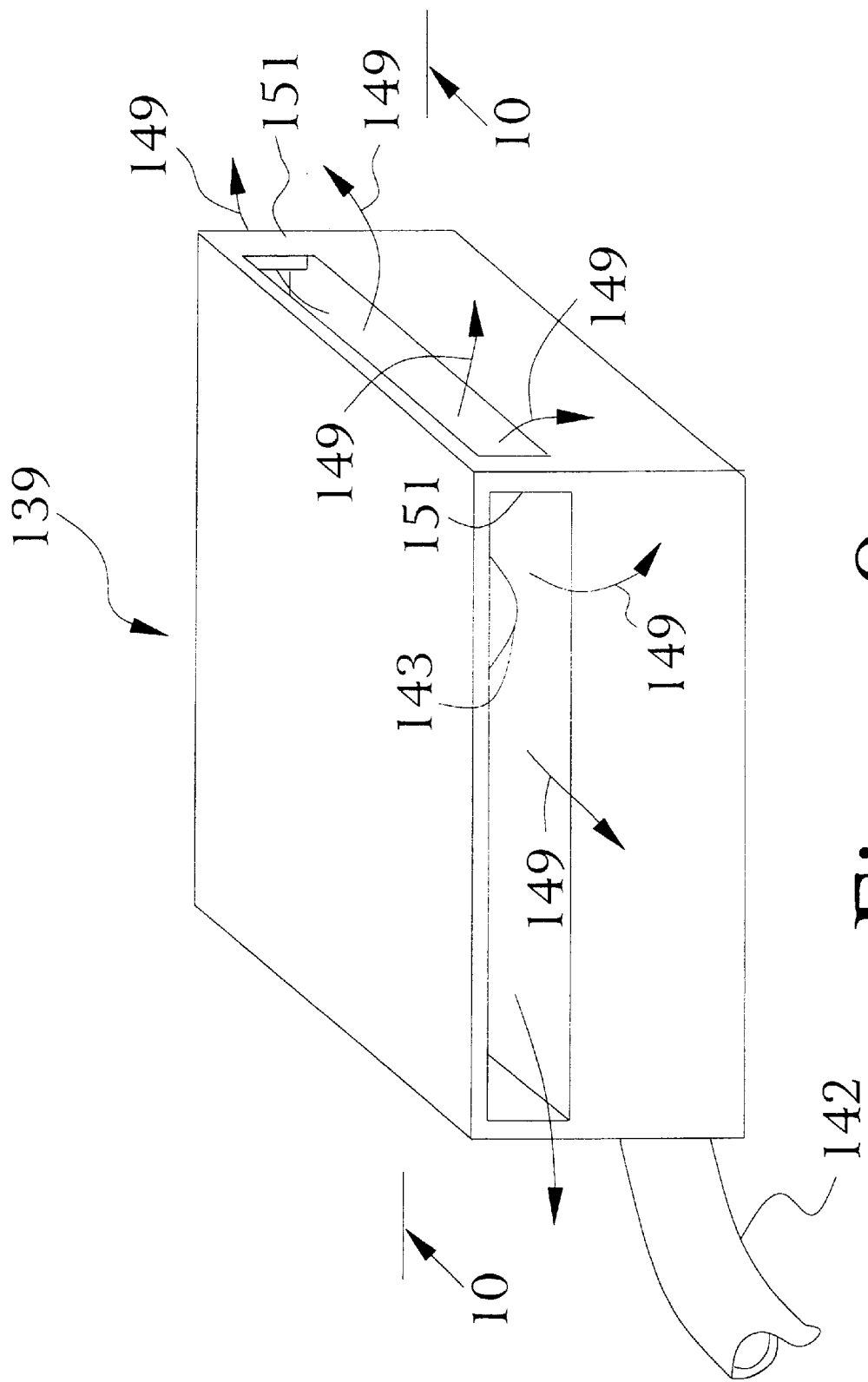
FIG. 9 is a, perspective view of an air release box useful in the invention.
Figure 10:
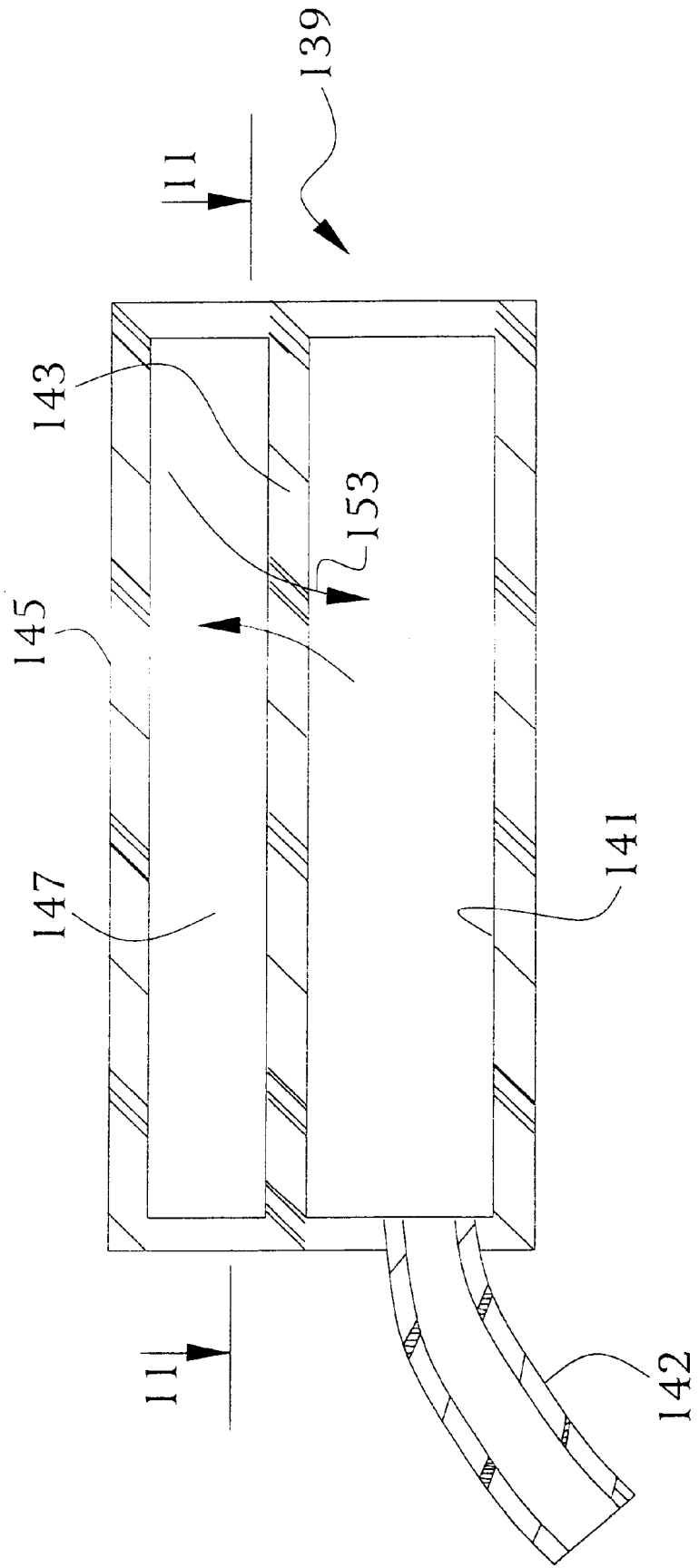
FIG. 10 is a view in cross section along lines 10—10 of FIG. 9.
Figure 11:
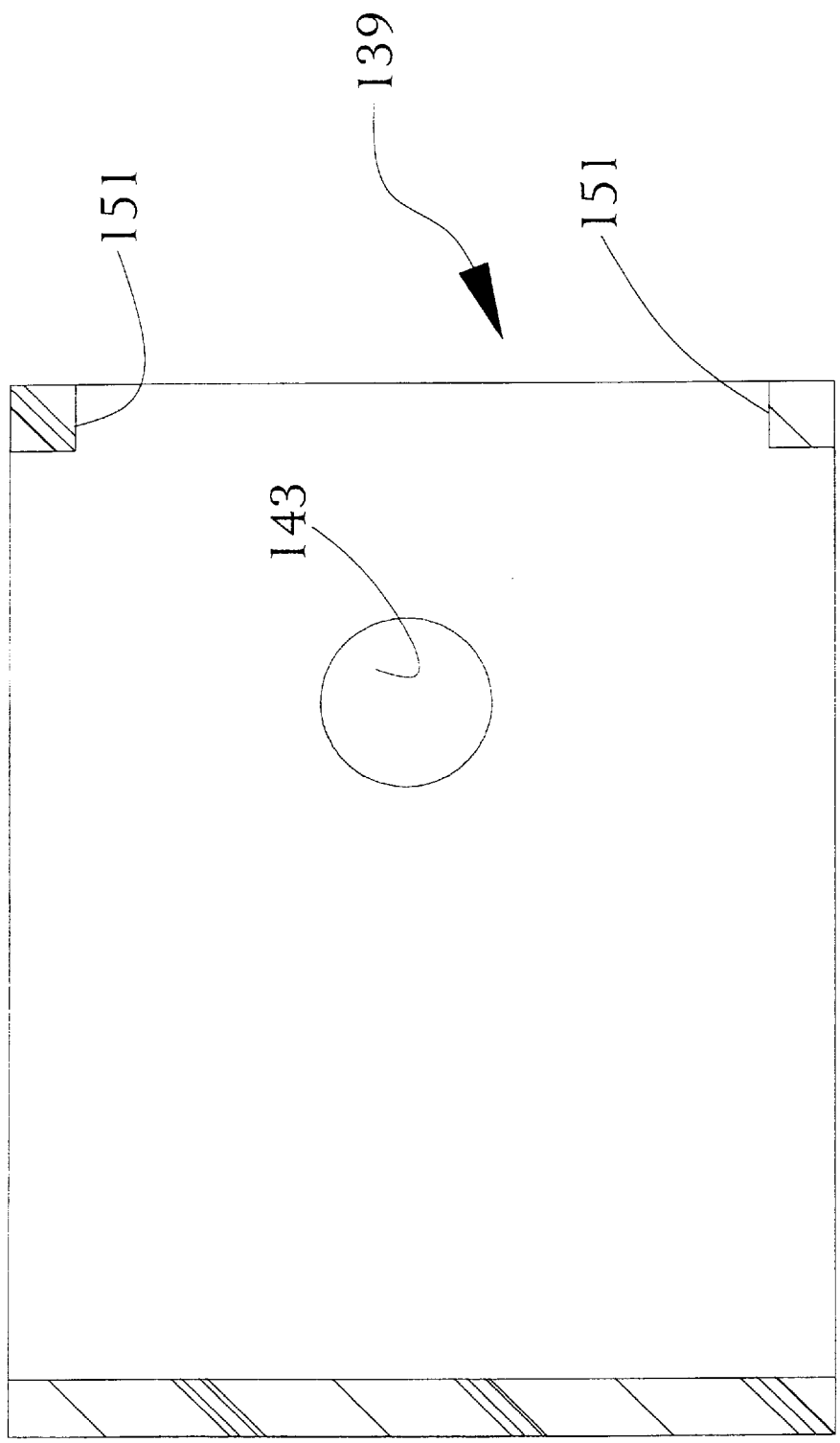
FIG. 11 is a cross-sectional view along lines 11—11 of FIG. 10.

As can be seen in FIGS. 9 through 11, the air boxes comprise an inner chamber 141 which is pneumatically coupled via a plastic tube 142 and provides for the release of air through a hole 143. Because the air boxes are contained between other elements of the bag and may thus be likely to have the hole 143 obstructed, a protective cowl 145 is provided to insure an air space 147 for the exhaust of air in the directions indicated by arrows 149. The structural integrity of the protective cowl 145 and its position is insured by a pair of support posts 151.

A zipper 134 runs along an edge 136 of outer shell 112, continues along edge 138 of outer shell 112, and again continues along a edge 140 of outer shell 112, where it meets at a hinge 144, defined by the fabric interface between the top portion or lid 146 of the case 110 and the main body 148 of case 110.

Again referring to FIG. 5, compressible air bladders 114, 116, 118 and 119 are made of a flexible material, most preferably poly vinyl chloride or other similar plastic which is relatively unstretchable.

In accordance with this embodiment of the invention, it is contemplated that upon the receiving of a shock, member 120 will spread the impact over one or two air bladders, causing the air bladders to be depressed and release air through their respective tubes 142 with which each of the air bladders is associated, resulting in the release of air through the respective box 139 and its air release hole 143.

In the case of a closed bladder, the force exerted by the bladder on the falling computer during an impact is the product of the spring constant and the displacement of the computer as the distance between the computer and, for example, the floor is being reduced. Thus, it is seen that the force will initially be very close to zero and substantially no slowing down of the falling computer will occur. Conversely, it can be seen that as the distance between the computer and the hard object upon which it has been dropped approaches its minimum value, the amount of force exerted by a sealed bladder, as in the FIG. 1 embodiment, will be at its maximum and may result in deceleration of the computer at a rate which will cause damage.

In accordance with the present invention it is possible to apply greater force than the insubstantial force applied during the initial phase of bladder compression, thus resulting in useful deceleration of the falling computer at a rate which does not cause damage. After the initial deceleration, as described above, the system continues with the controlled release of air, as in the initial phase, resulting in further useful deceleration of the falling computer without damage. Finally, as the computer continues to fall and the distance between the falling computer and the hard surface upon which it has been dropped is approaching its minimum value, because air has been released by the bladder, the high forces attendant to what would otherwise have been substantial compression of the air, are not present and, accordingly, continued deceleration occurs at a rate that is not so great as to damage the computer.

Thus, when the computer in the case 110 is dropped, pressure is put on the bladders, which release air resulting in characteristics which provide for relatively uniform deceleration at a rate which does not cause damage to the computer contained within the case. After the fall, the polyester material 132 acts like a spring which causes the bladders to expand and suck in air through their respective tubes 142, air boxes 139, and holes 143. Such air moves in the direction indicated by arrow 153, as illustrated in FIG. 10.

While, in principle, no strechability is required, as the air bladder relies on the viscosity of the air contained within the bladders to achieve the controlled release of air required for shock absorption, in the event that a stretchable material is used, the shock absorption characteristic of the system will be a complex resultant of the compressibility of air, and the viscosity of the air and the size of the hole in the boxes 139 through which it is being released.

A cross section of the preferred embodiment of the inventive device can be seen in accordance with FIG. 7. In particular, a layer of compressible foam 150 is mounted to an inside surface 152 of outer shell 1120 Foam layer 150 is mounted, most preferably, by an adhesive which remains flexible after setting. Once again other suitable means may be utilized to secure foam layer 150 to surface 152. In similar fashion, a layer of compressible foam 154 is mounted to a surface 156 of outer shell 112.

In the preferred embodiment, shown in FIG. 4, when a force is applied, as shown by an arrow 158, to outer shell 112, rigid member 120 serves to spread the force over the area of air bladder 116 thereby reducing the per area unit force experienced by computer 130. This reduction in per area unit force translates into lower incidence of damage to computer 130.

This is the case because all of the energy involved in the reduction of the velocity of the computer during an impact is not concentrated in one spot, but is spread out, resulting in relatively small amounts of energy being absorbed by different parts of the computer.

In similar manner, a force, as shown by an arrow 160, is spread across bladder 114 by member 120 again reducing the per area unit force experienced by computer 130. In similar manner still, a force, as shown by an arrow 162, is spread across bladder 118 by member 120, once again reducing per area unit force experienced by computer 130.

Referring, still, to the preferred embodiment shown in FIG. 3, foam layer 150, by compressing, acts to absorb a force as shown by an arrow 164 thereby reducing the impact to computer 130. In like fashion, foam layer 154 acts to absorb forces as shown by a arrow 166 again reducing the impact to computer 130.

In accordance with this embodiment of the invention, the springy material 132 is picked for its ability to exert a force strong enough to cause the air bladder to expand against the weight of the computer. This will also result in providing for relatively quick recovery, something particularly valuable in the case of multiple impacts.

If, for example, we consider a force which impacts the bag in the direction indicated by arrow 172, this force can be resolved into two vector components represented by arrows 174 and 176. The force represented by arrow 174 is transmitted to member 122 which in turn causes it to be applied to the computer 130 through bladder 116. Similarly, the force represented by arrow 176 would be applied to member 124 which would transmit the force, over time, through bladder 118 to the laptop computer 130.

Without the use of member 120, the tendency of a force hitting the computer in the case in the direction and at the position indicated by an arrow 178, for example, would be to compress one side of the bladder 118, thus using only a portion of the volume of that bladder, as opposed to using all of the volume of the bladder and the volume of bladder 116, in addition. In similar fashion, a force striking the case at the position and at the angle indicated by arrow 162 would, through the use of corner 170, be absorbed using substantially all the volume of bladder 118.

Figure 12:
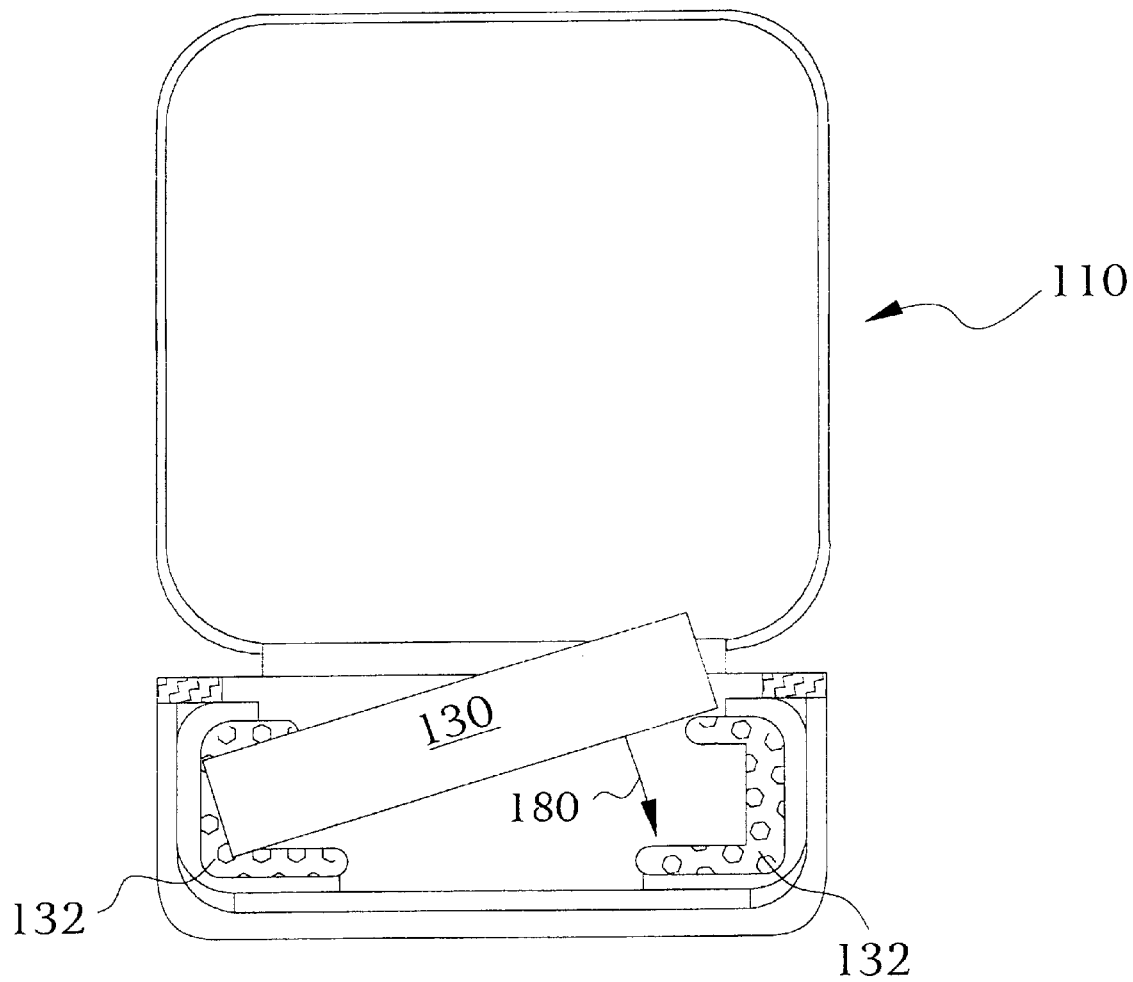
FIG. 12 is a view partially in cross section and similar to the view of FIG. 8 illustrating the insertion of a computer into inventive case.

The hole 122 defined by member 120 is large enough to allow the insertion of the computer 130 into the case within as illustrated in FIG. 12. As can be seen in that Figure, the material 132 in the bladders is deformed during insertion of the computer in the direction indicated by arrow 180. After the computer has been inserted, the bladders and the material are somewhat compressed as can be seen from a comparison of the material in FIGS. 8 and 3. The result is that computers of varying sizes may be accommodated by varying compression of material 132, without the need for adjustable members or movable members or many sizes of cases.

Figure 13:
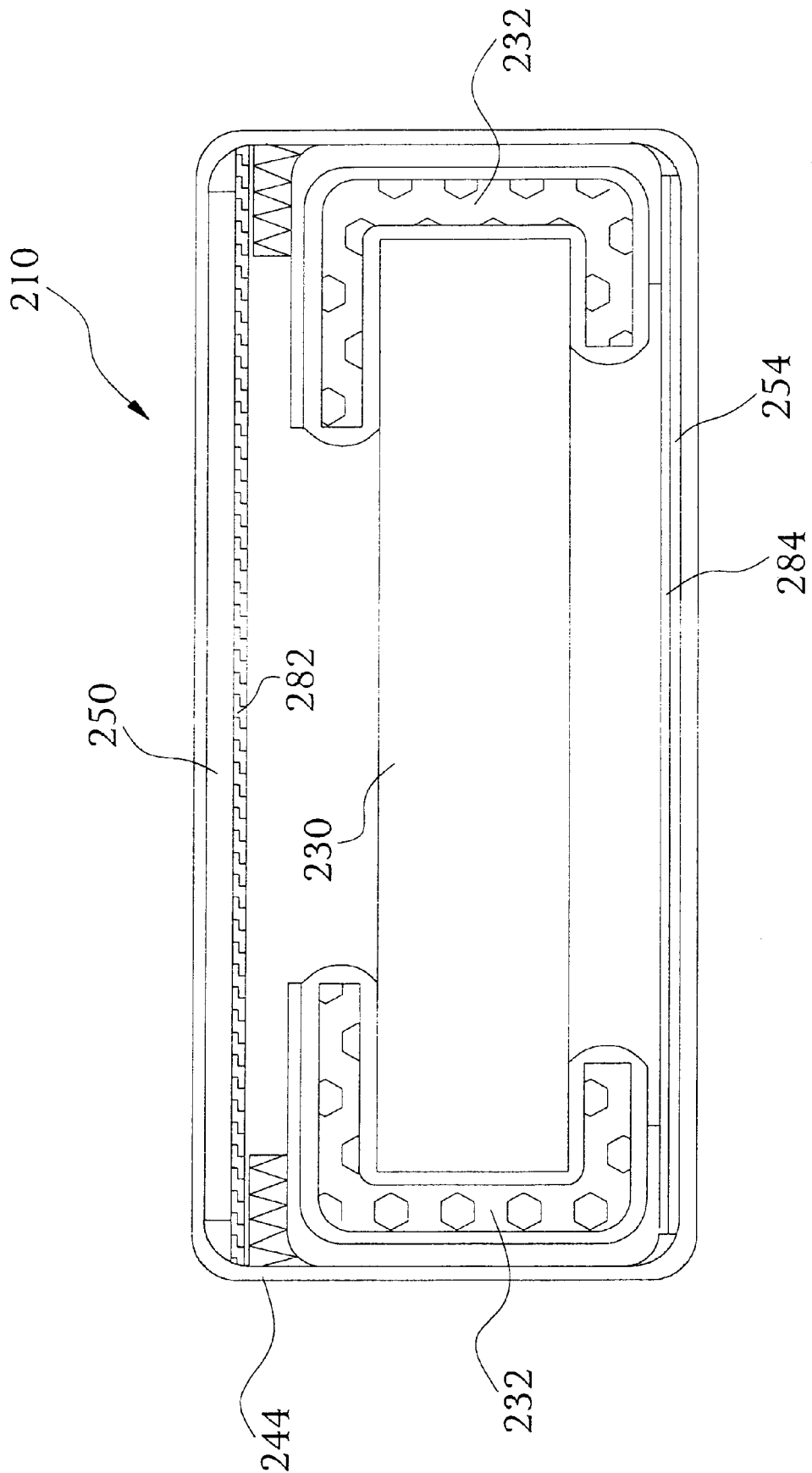
FIG. 13 is a cross-sectional view of an alternative embodiment of the invention incorporating certain aesthetic features.

An alternative embodiment of the invention is illustrated in FIG. 13. Here a computer case 210 is provided with a liner 282 and a second liner 284 which performs the function of covering from view foam pads 250 and 254.

Figure 14:
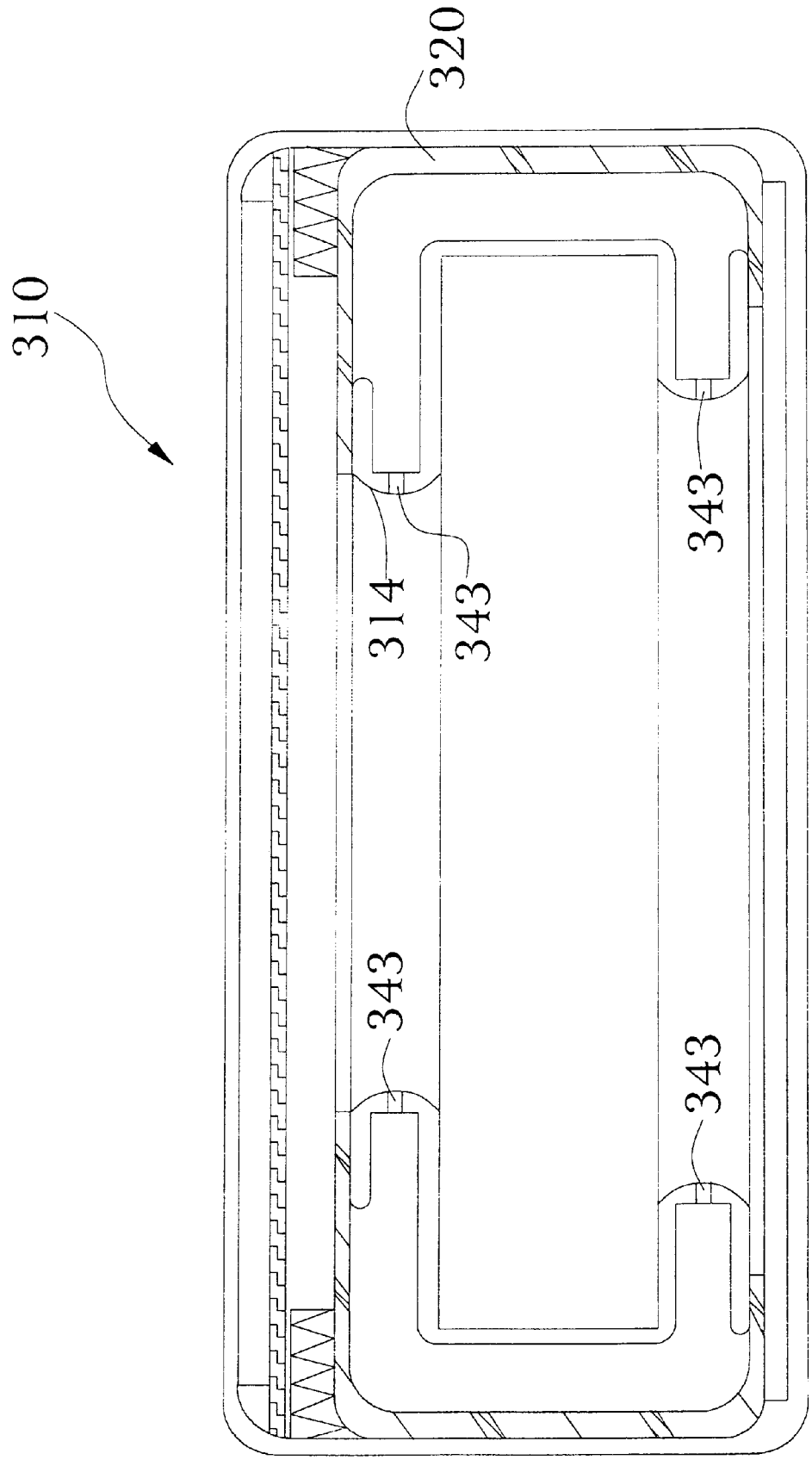
FIG. 14 is a cross-sectional view of yet another alternative embodiment of the inventive computer case.

As illustrated in FIG. 14, yet another preferred embodiment of a computer case 310 constructed in accordance with the present invention is illustrated. In this case, the bladders are replaced by a single flexible plastic rubber-like member 314 which extends completely around member 320 which is identical to member 120 illustrated in FIG. 6. Member 314, together with member 320 forms an air tight member which acts to cushion impacts on the computer 330 when it is dropped. In accordance with a preferred embodiment of the invention, member 314 is provided with controlled air release holes 343 to provide for cushioned impact in the same manner as the embodiment illustrated in FIGS. 3 through 12.

Figure 15:
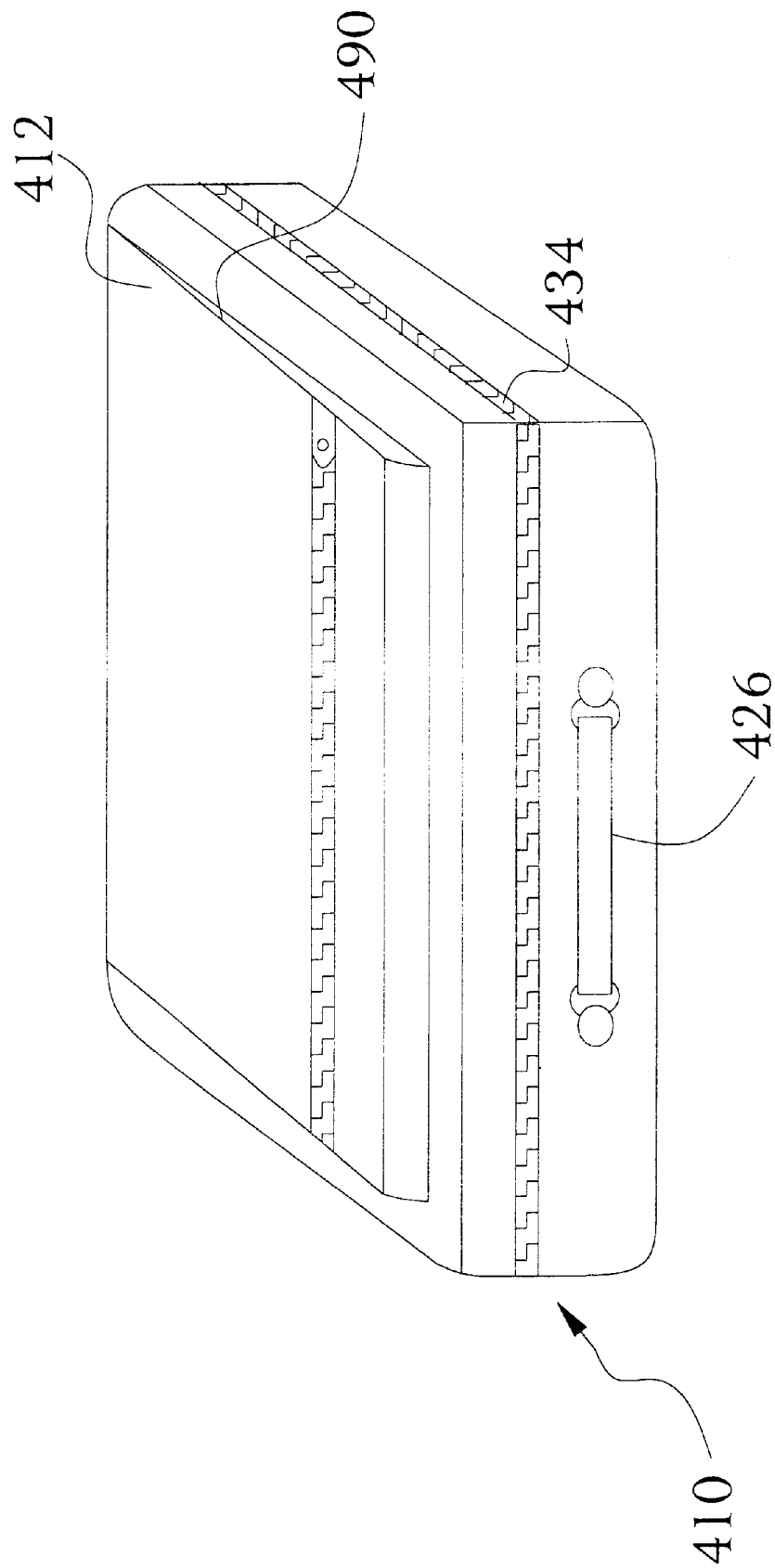
FIG. 15 is a perspective view of a more elaborate version of the inventive computer case.
Figure 16:
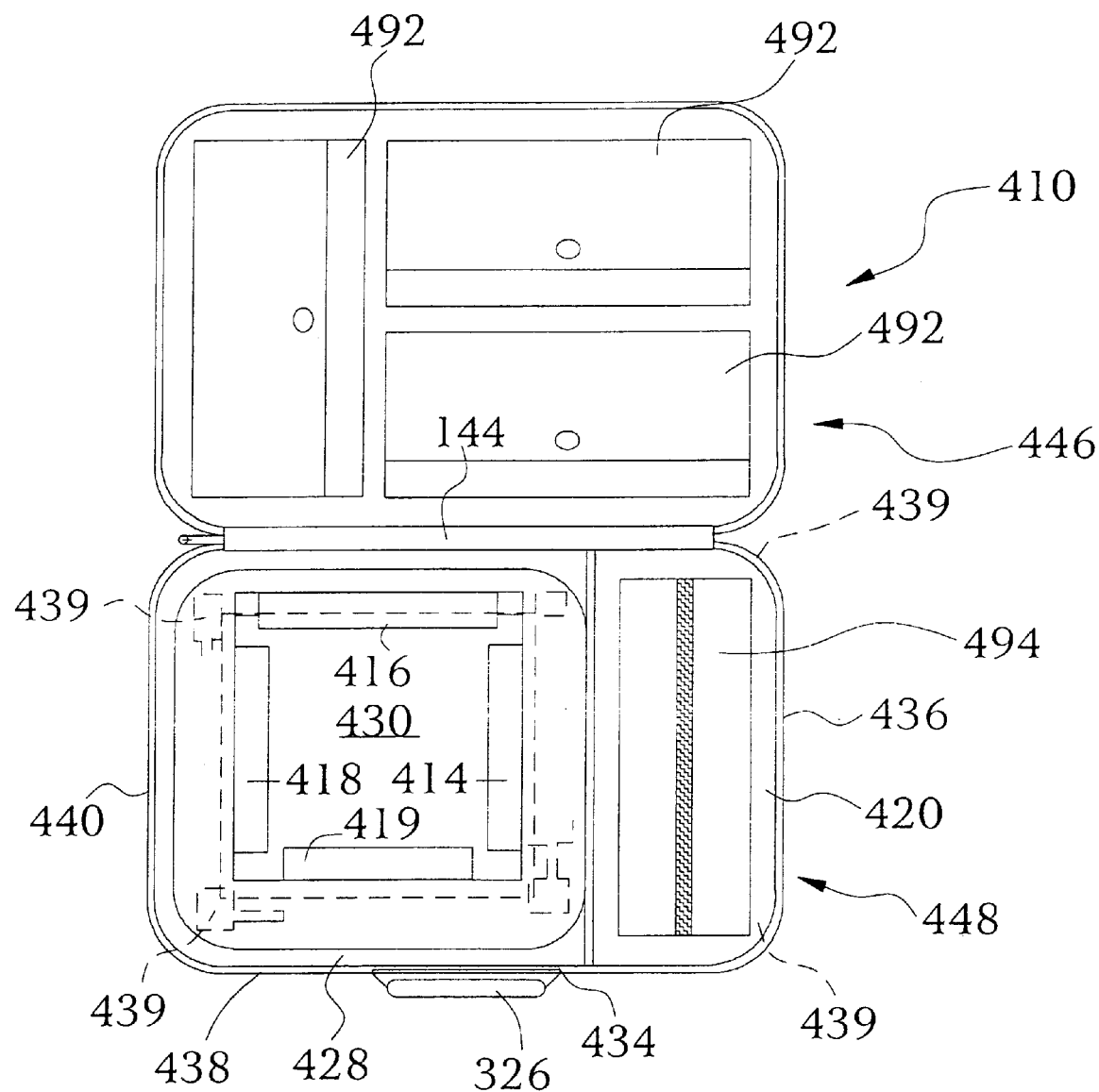
FIG. 16 is a top plan view of the case illustrated in FIG. 15, but with the top opened to reveal its features.

Yet another embodiment of the invention is illustrated in FIGS. 15 and 16. For brevity of illustration, the case 410 in this embodiment has been numbered with numbers which are 300 higher than the numbers of corresponding parts in the embodiment of FIG. 3. In all respects this case is similar to that of the embodiment of FIG. 3, except that it is of wider dimension and has a zippered compartment 490 on the outside, and a number of snap-down compartments 492 on the inside and a zippered compartment 494 on the inside.

Figure 17:
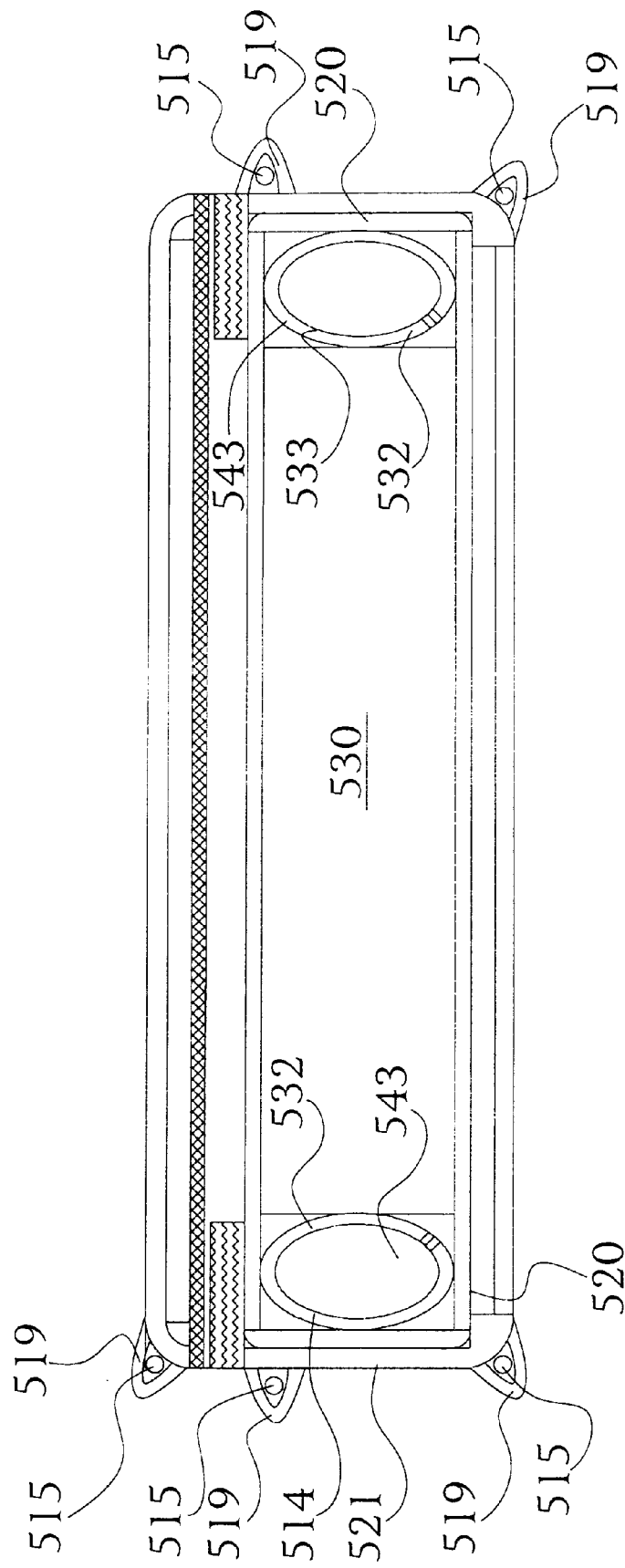
FIG. 17 is a cross-sectional view of yet another alternative embodiment of the inventive computer case.
Figure 18:
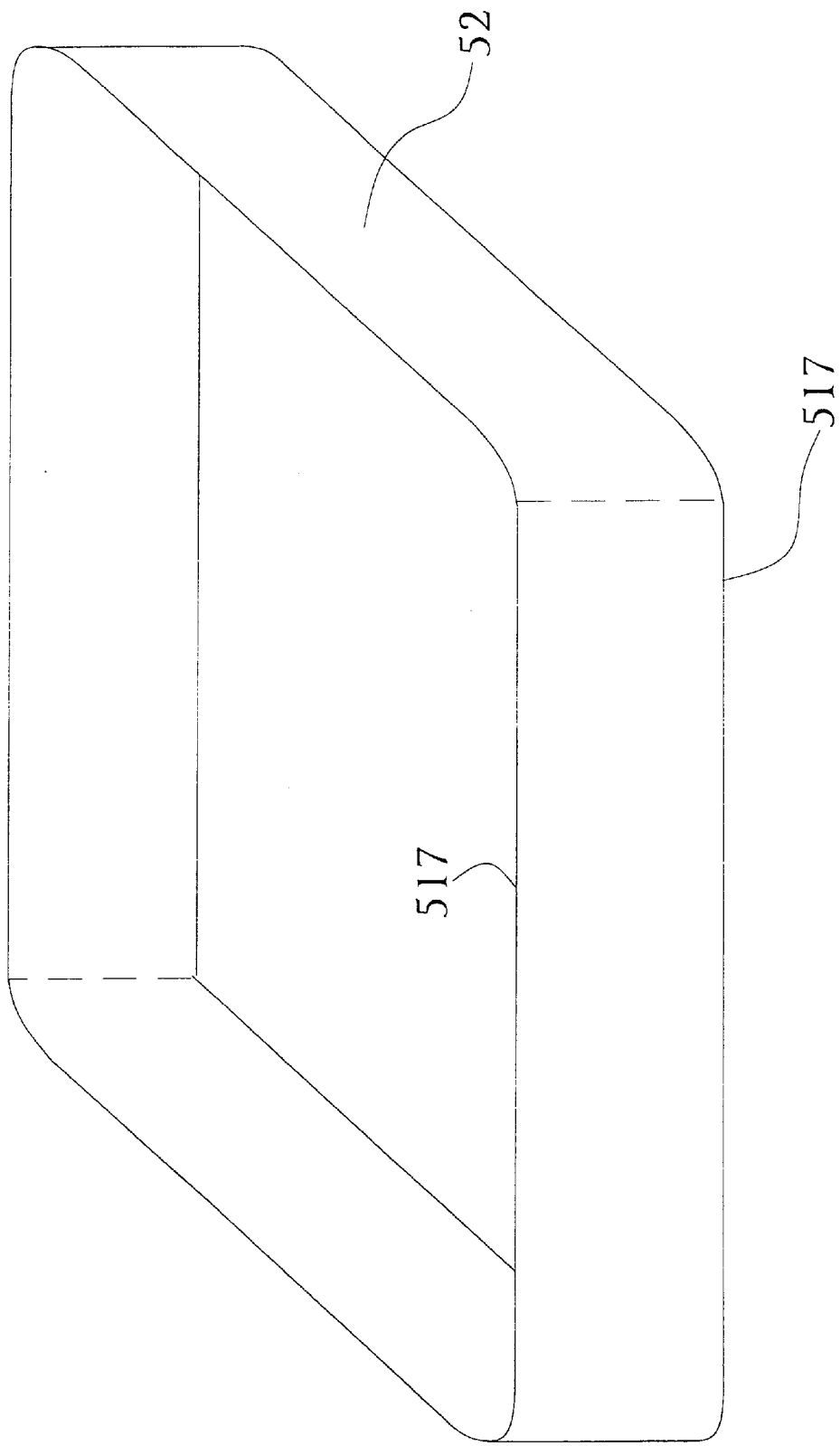
FIG. 18 is a perspective view of stiffening member useful in the invention.

Finally, as illustrated in FIG. 17, yet another preferred embodiment of a computer case 510 constructed in accordance with the present invention is illustrated. In this case, four bladders 514 are supported within a single continuous wrap around bendable, but relatively stiff plastic member 520, which extends completely around the perimeter of bag 510. Stiff plastic member 520 is made of a single strip of stiff plastic having a width about equal in magnitude to the height of a computer to be contained within inventive bag 510. Alternatively, member 520 may be made out of metal.

In similar fashion, a pair of wraparound wires 515, each having a length equal to the length of plastic strip member 520, are both formed into rectangular perimeterial shapes, and face and run parallel to the top and bottom edges 517 of support member 520. Wires 515 are contained within piping 519, which is sewn into the bottom corner of the bag, and adjacent the zipper. Alternatively, the piping and wire assembly may be placed at the opposite corner at the top of the bag, as illustrated in dashed lines in FIG. 17.

In accordance with the preferred embodiment, wires 515 are made of steel and very stiff, and are positioned as close as possible to the edges 517 to improve the rigidity of the structure, particularly when the case is hit, for example by a corner of an object, at a point between the two wires 515. While it is not required to achieve good shock protection, superior protection is afforded by the gluing of the fabric of bag side 521 to the outside of plastic strip member 520.

More particularly, when a computer 530 is contained within bag 510, the height of the computer fills the inside of the bag and tends to stretch the sides 521 taut. The result is to improve the rigidity of the overall structure formed by plastic strip member 520, wires 515, and, in the case of a plastic strip member 520 glued to the bag side.

Thus, if a bag is hit in between the two wires 515, the force of the impact will be spread to a large portion of the area of at least one of the four sides of the plastic strip member 520, and, depending on the nature of the impact, on the adjacent side of plastic strip member. This causes a general overall compression of the bladder or bladders involved and thus a maximization of their shock absorbing potential. In addition to such maximization, the use of the inventive stiff structures of the embodiments of FIGS. 6, 14 and 17, for example, also have the effect of tending to make uniform the effect of a wide variety of different types of shocks on the operation of the bladders 514 as shock absorbers. This means that their characteristics will provide protection in the preferred range of operation for a wider range of different types and magnitudes of shocks. Most importantly, the use of the inventive stiff structure yields an economical way of doing this, as relatively ordinary manufacturing techniques may be employed with the use of special tooling.

Figure 19:
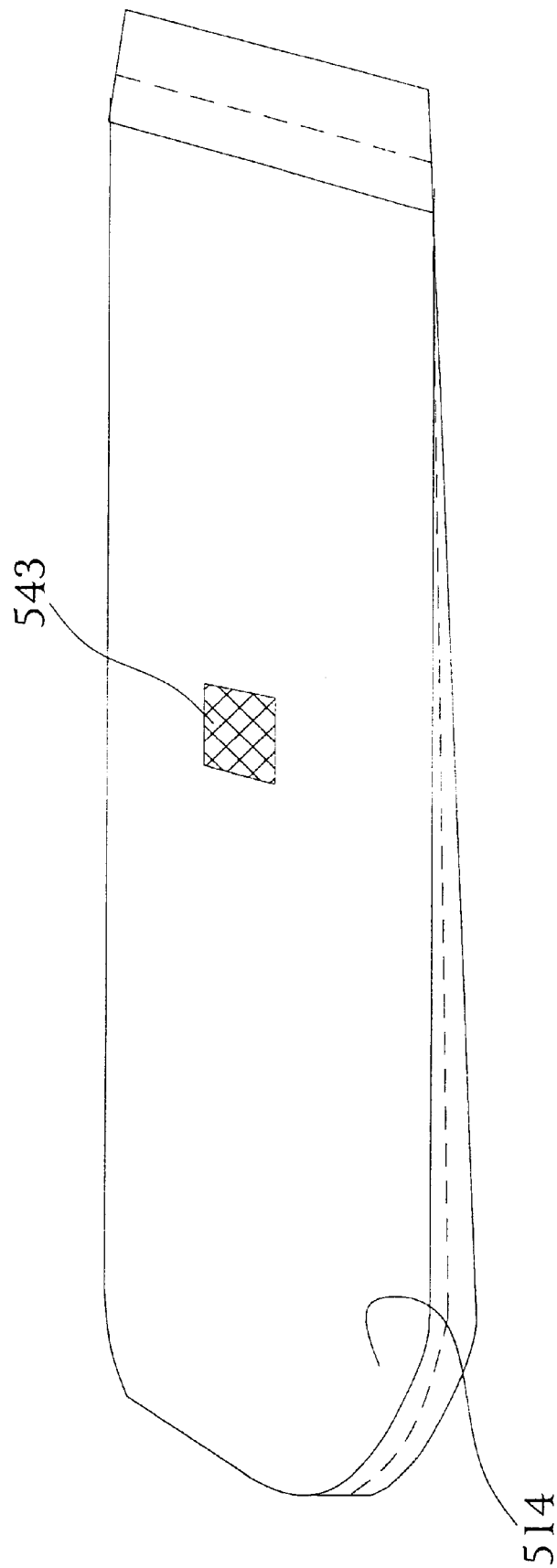
FIG. 19 is a perspective view of an air bladder useful in the invention.

Bladders 514, together with member 520 forms an air cushioned shock absorbing structure with a controlled air release port, which acts to cushion impacts on the computer 530 when it is dropped. In accordance with a preferred embodiment of the invention, as illustrated in FIG. 19 bladders 514 are provided with controlled air release ports 543 to provide for cushioned impact in the same manner as the embodiment illustrated in FIGS. 3 through 12. Ports 543 may simply be holes in the air impermeable fabric of bladders 514 closed with nylon screening or mesh fabric which may simply be sewn into place.

Figure 20:
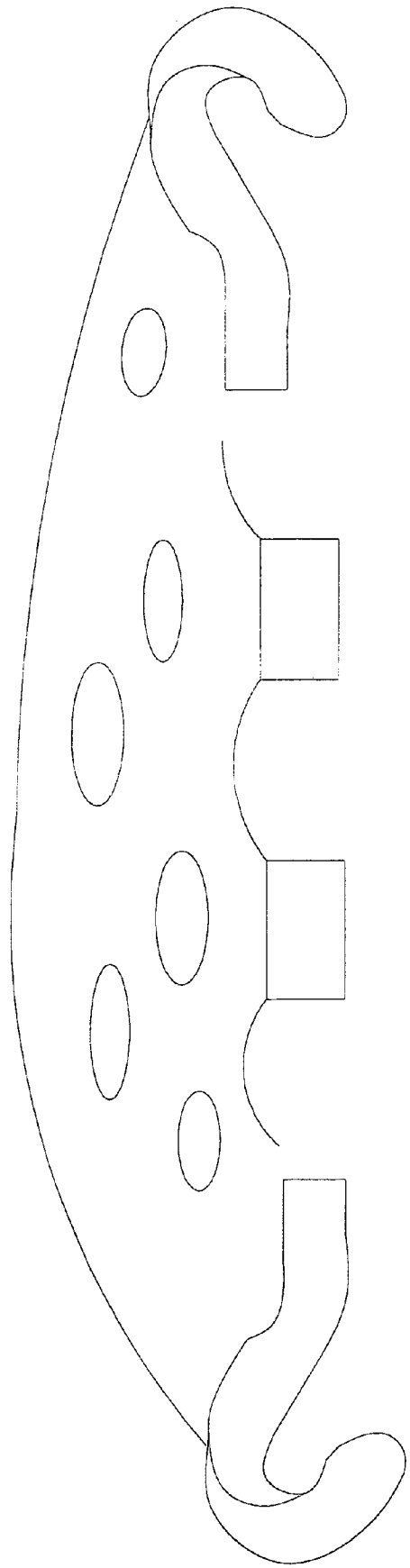
FIG. 20 is a cut-away perspective view of an air release button useful in the invention.

Alternatively, the ports may take the form of a metal button-like member 643 with holes 645 in it as illustrated in FIGS. 20 and 21. Such members are readily available on the market as findings and their characteristics may be varied by backfilling one or more of the holes 645 with silicone caulking compound or similar material.

The size of the ports is selected to provide maximum shock protection for a computer, depending on the weight of the computer, the volume and dimensions of the bladder 514, and the maximum shock to which the computer can be subjected without damage. The same is best determined by repeatedly, but with different sized ports, dropping from a fixed height a bag equipped with a shock measuring device and containing a computer of the type to be carried, until the shock of the impact is minimized, and then repeating the operation at different heights, and with different types of impacts in order to round out the data and select the overall best port size under different use conditions.

It is necessary that the bladders have the characteristic of being resilient, and must be filled with a resilient member, such as polyester fiber stuffing, plastic foam, a plastic foam tube or, as illustrated in FIG. 17, a resilient rubber-like plastic tube 532. Tube 532 has a hole 533, to allow the escape of air through port 543 during shock impact, and refilling of the bladder with air after the shock has been absorbed.

While an illustrative embodiment of the invention has been described above, it is, of course, understood that various modifications will be apparent to those of ordinary skill in the art. Such modifications are within the spirit and scope of the invention, which is limited and defined only by the appended claims.

We claim:

1. A computer case having a bottom and a pair of sides comprising a flexible outer shell and a shock absorbing member, said shock absorbing member comprising a bladder, the inside of said bladder being in communication with the outside atmosphere through at least one opening dimensioned to discharge an amount of air sufficient to result in substantial but not complete deflation of said bladder in response to a mechanical force applied to said bladder when said computer case is dropped, said computer case further comprising relatively stiff members extending along said pair of sides and said bottom of said case, said relatively stiff member being formed by a pair of substantially rigid elongated members with a stiff plastic member disposed between them, said shock absorbing member being disposed between a computer contained within said case and said relatively stiff member.

2. A computer case as in claim 1, wherein said bladder is filled with a springy solid phase member.

3. A computer case as in claim 2, wherein said bladder extends around said bottom and said pair of sides of said case.

4. A shock absorbing structure, comprising a case, having a bottom and a pair of sides, for containing a device to be protected from the shock of mechanical forces, said case comprising a bladder having an undeformed shape, said bladder being constructed of substantially gas impervious material, said bladder defining a volume for containing air, said bladder having the characteristic of resiliently deforming in response to the application of force to said bladder, and tending to return to said undeformed shape upon the removal of such applied force, said bladder containing a quantity of air when said bladder is in said undeformed shape, said bladder being positioned between a space in said case intended for said device to be protected and an expected point of application of a mechanical force from which shock protection is desired, said bladder defining at least one hole for the discharge of air in response to the application of force to said bladder, said hole releasing air, in response to the application of mechanical force in a range resulting from the dropping of said case containing said device at a height at which protection from dropping is to be provided, at an air release rate which results in substantial deflation of said bladder, said case further comprising a relatively stiff member extending along said sides and said bottom, said relatively stiff member being formed by a pair of wires with a stiff plastic member disposed between them.

5. A case as in claim 4, wherein said bladder is elongated.

6. A case as in claim 4, wherein a hard member is positioned between said bladder and said point of application of a mechanical force.

7. In a briefcase of the type which includes a compartment portion made of a fabric-like briefcase material, a cap portion made of fabric-like briefcase material hinged to said compartment portion and a closure for securing said compartment portion to said cap portion, said compartment portion and said cap portion being configured and dimensioned to contain an object to be protected from shock, said object having a top face, a bottom face, a bottom edge disposed between said top face and said bottom face, a top edge disposed between said top face and said bottom force, a first side edge disposed between said top face and said bottom force, a second side edge disposed between said top face and said bottom force, said compartment portion and said cap portion defining an internal volume having, when said object is contained within said briefcase, a top face side facing said top face, a bottom face side facing said bottom face, a bottom edge side facing said bottom edge, a top edge side facing said top edge, a first side edge side facing said first side edge, and a second side edge side facing said second side edge the improvement comprising shock absorbing structure comprising a bladder having an undeformed shape, said bladder being constructed of substantially gas-impervious material, said bladder defining a volume for containing air, said bladder having the characteristic of resiliently deforming in response to the application of force to said bladder, and tending to return to its undeformed shape upon the removal of such applied force, said bladder containing a quantity of air when said bladder is in its undeformed shape, said bladder defining at least one port for the discharge of air in response to the application of force to said bladder, said briefcase further comprising a relatively stiff member extending along said side edges of said briefcase and said bottom edge of said briefcase, said relatively stiff member being formed by a pair of wires with a stiff [polymeric] plastic member disposed between them.

8. In a briefcase, the improvement of claim 7, wherein said bladder is filled with a resilient solid phase material.

9. In a briefcase, the improvement of claim 7, wherein said bladder is filled with springy fibrous material.

10. In a briefcase, the improvement of claim 7, wherein said bladder is filled with foam rubber.

11. In a briefcase, the improvement of claim 7, wherein said bladder contains a foam rubber member, said foam rubber member defining a void volume.

12. In a briefcase, the improvement of claim 11, wherein said foam rubber member defines an elongated void volume and said foam rubber member has a tubular shape and wherein said briefcase material is a woven material.

13. In a briefcase, the improvement as in claim 7, wherein said bladder is constructed in three separate sections, each of said sections consisting of an individual sub-bladder for discharging air in response to the application of force to said sub-bladder.

14. In a briefcase, the improvement as in claim 13, wherein one of said sections of said bladder extends adjacent said second side edge side, and the last of said sections of said bladder extends adjacent said bottom edge side.

* * * * *